US006814796B2

(12) United States Patent
Husband et al.

(10) Patent No.: US 6,814,796 B2
(45) Date of Patent: Nov. 9, 2004

(54) PIGMENT PRODUCTS

(75) Inventors: John Claude Husband, St. Austell (GB); Desmond Charles Payton, St. Austell (GB); Michele Susan Renals, St. Austell (GB)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 10/608,558

(22) Filed: Jun. 30, 2003

(65) Prior Publication Data

US 2004/0110885 A1 Jun. 10, 2004

Related U.S. Application Data

(63) Continuation of application No. 09/647,720, filed as application No. PCT/GB99/00888 on Apr. 1, 1999, now Pat. No. 6,616,749.

(30) Foreign Application Priority Data

Apr. 4, 1998 (GB) ................................ 9807180

(51) Int. Cl.[7] .............................................. C04B 14/04
(52) U.S. Cl. ........................ 106/486; 106/484; 106/486
(58) Field of Search .................................. 106/484, 486

(56) References Cited

U.S. PATENT DOCUMENTS

| | | |
|---|---|---|
| 2,158,987 A | 5/1939 | Maloney |
| 3,034,859 A | 5/1962 | Gunn et al. |
| 3,171,718 A | 3/1965 | Gunn et al. |
| 3,526,768 A | 9/1970 | Rai et al. |
| 3,615,806 A | 10/1971 | Torock et al. |
| 3,635,662 A | 1/1972 | Lyons |
| 3,798,044 A | 3/1974 | Whitley et al. |
| 4,125,411 A | 11/1978 | Lyons |
| 4,176,148 A | 11/1979 | Magder et al. |
| 4,183,991 A | 1/1980 | Smiley et al. |
| 4,198,333 A | 4/1980 | von Bonin et al. |
| 4,221,697 A | 9/1980 | Osborn et al. |
| 4,225,496 A | 9/1980 | Columbus et al. |
| 4,227,920 A | 10/1980 | Chapman et al. |
| 4,233,199 A | 11/1980 | Abolins et al. |
| 4,234,469 A | 11/1980 | Ohta et al. |
| 4,241,142 A | 12/1980 | Kaliski et al. |
| 4,243,574 A | 1/1981 | Manwiller |
| 4,250,077 A | 2/1981 | von Bonin et al. |
| 4,251,576 A | 2/1981 | Osborn et al. |
| 4,298,711 A | 11/1981 | Moulson et al. |
| 4,311,635 A | 1/1982 | Pearson |
| 4,359,497 A | 11/1982 | Magder et al. |
| 4,381,948 A | 5/1983 | McConnell et al. |
| 4,409,344 A | 10/1983 | Moulson et al. |
| 4,414,352 A | 11/1983 | Cohen et al. |
| 4,427,450 A | 1/1984 | Kostansek |
| 4,467,057 A | 8/1984 | Dieck et al. |
| 4,543,287 A | 9/1985 | Briggs et al. |
| 4,546,126 A | 10/1985 | Breitenfellner et al. |

(List continued on next page.)

FOREIGN PATENT DOCUMENTS

| | | |
|---|---|---|
| DE | 2 241 577 | 3/1973 |
| DE | 24 49 656 | 12/1975 |
| DE | 26 58 814 | 2/1978 |
| DE | 28 18 954 | 11/1978 |
| DE | 27 39 620 | 3/1979 |
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 43 01 730 | 7/1993 |
| DE | 42 13 746 | 10/1993 |
| DE | 38 84 605 | 8/1998 |
| DE | 100 10 941 | 9/2001 |
| EP | 0 001 066 | 4/1980 |

(List continued on next page.)

OTHER PUBLICATIONS

Brochure: "Kaopaques Delaminated Aluminum Silicates for Paint Systems," Georgia Kaolin Co., 433 N. Broad Street, Elizabeth, NJ 07207, Oct. 1975.

Burgess, Malcolm, "Kaolin, a Glaciers Gift to Georgia," 1985.

Clay Minerals Society Homepage, http://cms/lanl.gov/instruct.html, "Instructions for Authors, Clays and Clay Minerals," *Instructions for Authors*, p. 4 of 5.

Jepson, W. P., "Kaolins, their properties and uses," *Phil. Trans. R. Soc. Lond.*, A311, 411–432, 1984.

Swan, A., "Realistic paper tests for varying printing processes," *Printing Technology*, 13(1), 9–22, Apr., 1969.

Abstract, Japanses Patent No. 08012886A, publication date Jan. 1996.

Abstract, German Patent No. 3679147.

Abstract, German Patent No. 3689760.

Abstract, German Patent No. 3565272.

Abstract, German Patent No. 3466547.

U.S. patent application Ser. No. 09/647,720, now U.S. patent No. 6,616,749, Filed Oct. 4, 2000, Attorney Docket No. 078810.0109–00 (formerly 07812.0038–00).

(List continued on next page.)

*Primary Examiner*—C. Melissa Koslow
*Assistant Examiner*—Shalie Manlove
(74) *Attorney, Agent, or Firm*—Finnegan, Henderson, Farabow, Garrett & Dunner, L.L.P.

(57) ABSTRACT

A pigment product suitable for use in a coating composition to provide a gloss coating on paper, the pigment product comprising a processed particulate kaolin whose particles have a particle size distribution such that at least 80% by weight of the particles have an equivalent spherical diameter less than 2 μm and not less than 8%, preferably not less than 12%, by weight of the particles have an equivalent spherical diameter less than 0.25 μm and whose particles have a shape factor of at least 45, preferably at least 50.

48 Claims, No Drawings

U.S. PATENT DOCUMENTS

| | | | |
|---|---|---|---|
| 4,582,866 A | 4/1986 | Shain | |
| 4,584,333 A | 4/1986 | Prigent et al. | |
| 4,708,975 A | 11/1987 | Shain | |
| 4,795,776 A | 1/1989 | Milner | |
| 4,820,761 A | 4/1989 | Saito et al. | |
| 4,873,116 A | 10/1989 | Ancker | |
| 4,888,315 A | 12/1989 | Bowman et al. | |
| 4,889,886 A | 12/1989 | Wada et al. | |
| 4,918,127 A | 4/1990 | Adur et al. | |
| 4,943,324 A | 7/1990 | Bundy et al. | |
| 4,966,638 A | 10/1990 | Mudgett | |
| 4,981,521 A | 1/1991 | Bettacchi et al. | |
| 5,085,707 A | 2/1992 | Bundy et al. | |
| 5,112,782 A | 5/1992 | Brown et al. | |
| 5,128,606 A | 7/1992 | Gate et al. | |
| 5,167,707 A | 12/1992 | Freeman et al. | |
| 5,168,083 A | 12/1992 | Matthews et al. | |
| 5,169,443 A | 12/1992 | Willis et al. | |
| 5,294,654 A | 3/1994 | Hellstern-Burnell et al. | |
| 5,332,493 A | 7/1994 | Ginn et al. | |
| 5,364,899 A | 11/1994 | Watanabe et al. | |
| 5,411,587 A | 5/1995 | Willis et al. | |
| 5,416,151 A | 5/1995 | Tanaka | |
| 5,439,558 A | 8/1995 | Bergmann et al. | |
| 5,454,865 A | 10/1995 | Ginn et al. | |
| 5,516,829 A | 5/1996 | Davis et al. | |
| 5,522,924 A | 6/1996 | Smith et al. | |
| 5,573,946 A | 11/1996 | Haxell et al. | |
| 5,578,659 A | 11/1996 | Anada et al. | |
| 5,624,488 A | 4/1997 | Forbus et al. | |
| 5,645,635 A | 7/1997 | Behl et al. | |
| 5,685,900 A | 11/1997 | Yuan et al. | |
| 5,707,912 A | 1/1998 | Lowe et al. | |
| 5,735,946 A | 4/1998 | Bloodworth et al. | |
| 5,749,958 A | 5/1998 | Behl et al. | |
| 5,810,998 A | 9/1998 | Arrington-Webb et al. | |
| 5,846,309 A | 12/1998 | Freeman et al. | |
| 5,879,512 A | 3/1999 | McGenity et al. | |
| 5,925,454 A | 7/1999 | Bekele | |
| 5,948,156 A | 9/1999 | Coutelle et al. | |
| 6,031,036 A | 2/2000 | Rosenquist et al. | |
| 6,149,723 A | 11/2000 | Pruett et al. | |
| 6,186,335 B1 | 2/2001 | Arrington-Webb et al. | |
| 6,262,161 B1 | 7/2001 | Betso et al. | |
| RE37,385 E | 9/2001 | Okada et al. | |
| 6,312,511 B1 | 11/2001 | Bilimoria et al. | |
| 6,402,826 B1 * | 6/2002 | Yuan et al. | 106/486 |
| 6,537,363 B1 * | 3/2003 | Golley et al. | 106/486 |
| 6,554,892 B1 | 4/2003 | Manasso et al. | |
| 6,564,199 B1 | 5/2003 | Pruett et al. | |
| 6,610,137 B2 * | 8/2003 | Golley et al. | 106/486 |
| 6,616,749 B1 * | 9/2003 | Husband et al. | 106/486 |

FOREIGN PATENT DOCUMENTS

| | | |
|---|---|---|
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |
| EP | 0 274 888 | 7/1988 |
| EP | 0 341 981 | 11/1989 |
| EP | 0 352 714 | 1/1990 |
| EP | 0 456 363 | 11/1991 |
| EP | 0 475 434 | 3/1992 |
| EP | 0 524 635 | 1/1993 |
| EP | 0 528 078 | 2/1993 |
| EP | 0 586 904 | 3/1994 |
| EP | 0 588 239 | 3/1994 |
| EP | 0 589 461 | 3/1994 |
| EP | 0 596 442 | 5/1994 |
| EP | 0 691 375 | 1/1996 |
| EP | 0 824 130 | 2/1998 |
| EP | 1 088 852 | 4/2001 |
| FR | 2 150 953 | 4/1973 |
| FR | 2 273 040 | 12/1975 |
| FR | 2 359 874 | 2/1978 |
| FR | 2 389645 | 12/1978 |
| FR | 2 452 511 | 10/1980 |
| FR | 2 558 168 | 7/1985 |
| FR | 2 774 689 | 8/1999 |
| GB | 1032536 | 6/1966 |
| GB | 1118723 | 7/1968 |
| GB | 1375057 | 11/1974 |
| GB | 1469028 | 3/1977 |
| GB | 1493393 | 11/1977 |
| GB | 1513657 | 6/1978 |
| GB | 1597213 | 9/1981 |
| GB | 2223758 | 4/1990 |
| GB | 2240398 | 7/1991 |
| GB | 2310215 | 8/1997 |
| JP | 51005383 | 1/1976 |
| JP | 53016063 | 2/1978 |
| JP | 54010394 | 1/1979 |
| JP | 54047751 | 4/1979 |
| JP | 55131024 | 10/1980 |
| JP | 59074152 | 4/1984 |
| JP | 60023448 | 2/1985 |
| JP | 60038455 | 2/1985 |
| JP | 60084364 | 5/1985 |
| JP | 60161443 | 8/1985 |
| JP | 60235858 | 11/1985 |
| JP | 62116667 | 5/1987 |
| JP | 62232452 | 10/1987 |
| JP | 63132964 | 6/1988 |
| JP | 63175047 | 7/1988 |
| JP | 02-018362 | 1/1990 |
| JP | 02034653 | 2/1990 |
| JP | 02045551 | 2/1990 |
| JP | 04122752 | 4/1992 |
| JP | 05262974 | 10/1993 |
| JP | 06016918 | 1/1994 |
| JP | 06065490 | 3/1994 |
| JP | 06502684 | 3/1994 |
| JP | 06145442 | 5/1994 |
| JP | 07502068 | 3/1995 |
| JP | 08022945 | 1/1996 |
| JP | 10114854 | 5/1998 |
| JP | 2000345032 | 12/2000 |
| JP | 2001098149 | 4/2001 |
| WO | WO 80/01167 | 6/1980 |
| WO | WO 80/02430 | 11/1980 |
| WO | WO 88/05804 | 9/1988 |
| WO | WO 90/11605 | 10/1990 |
| WO | WO 93/04119 | 3/1993 |
| WO | WO 94/07956 | 4/1994 |
| WO | WO 97/32934 | 9/1997 |
| WO | WO 97/34956 | 9/1997 |
| WO | WO 9837152 | 8/1998 |
| WO | WO 98/56860 | 12/1998 |
| WO | WO 98/58613 | 12/1998 |
| WO | WO 99/41309 | 8/1999 |
| WO | WO 99/51815 | 10/1999 |
| WO | WO 99/58613 | 11/1999 |

| | | |
|---|---|---|
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 01/12708 | 2/2001 |
| WO | WO 01/46307 | 6/2001 |
| WO | WO 01/66627 | 9/2001 |
| WO | WO 01/66635 | 9/2001 |
| WO | WO 02/16509 | 2/2002 |

OTHER PUBLICATIONS

U.S. patent application Ser. No. 09/930,994, now U.S. patent No. 2002/0,117,085, Filed Aug. 17, 2001, Attorney Docket No. 08819.0046–00.

U.S. patent application Ser. No. 10/077,936, ABN, Filed Jul. 18, 2002, Attorney Docket No. 07810.0095–00.

U.S. patent application Ser. No. 10/277,285, Filed Aug. 26, 2002, Attorney Docket No. 07810.0070–01.

U.S. patent application Ser. No. 10/233,599, Filed Sep. 4, 2002, Attorney Docket No. 07810.0107–00.

U.S. patent application Ser. No. 10/324,019, Filed Dec. 20, 2002, Attorney Docket No. 07810.0113–00.

U.S. patent application Ser. No. 10/312,448, Filed Dec. 27, 2002, Attorney Docket No. 07810.0114–00.

* cited by examiner

PIGMENT PRODUCTS

This is a continuation of Application Ser. No. 09/647,720, filed Oct. 4, 2000, now U.S. Pat. No. 6,616,749 which is a §371 filing of PCT/GB99/00888 filed Apr, 1, 1999, and claims the benefit of 9807180.6, filed in Great Britain on Apr. 4, 1998, all of which are incorporated herein by reference.

The present invention relates to pigment products, and their production and use in coating compositions.

The invention concerns the preparation of improved inorganic pigments for paper coating compositions, and, in particular, pigments for use in compositions for preparing gloss coated paper, especially lightweight and ultra lightweight coated paper.

Paper coating compositions are generally prepared by forming a fluid aqueous suspension of pigment material together with a hydrophilic adhesive and other optional ingredients. Lightweight coated, or LWC, paper is generally coated to a weight of from about 5 g.m$^{-2}$ to about 13 g.m$^{-2}$ on each side, and the total grammage, or weight per unit area of the coated paper is generally in the range of from about 49 g.m$^{-2}$ to about 65 g.m$^{-2}$. The coating may conveniently be applied by means of a coating machine including a short dwell time coating head, which is a device in which a captive pond of coating composition under a slightly elevated pressure is held in contact with a moving paper web for a time in the range of from 0.0004 second to 0.01 second, before excess coating composition is removed by means of a trailing blade. However, other types of coating apparatus may also be used for preparing lightweight coated paper. LWC paper is generally used for printing magazines, catalogues and advertising or promotional material. The coated paper is required to meet certain standards of surface gloss and smoothness. For example, the paper is generally required to have a gloss value of at least about 32, and up to about 50, TAPPI units, and a Parker Print Surf value in the range of from about 0.5μm to about 1.6 μm.

Ultra lightweight coated, or ULWC, paper is sometimes otherwise known as light lightweight coated, or LLWC, paper and is used for catalogues and for advertising and promotional material sent through the mail to reduce mailing costs. The coating weight is generally in the range of from 5 g.m$^{-2}$ to 7 g.m$^{-2}$ per side. The grammage is generally in the range of from about 35 g.m$^{-2}$ to about 48 g.m$^{-2}$.

A very important white inorganic pigment for use in preparing coating compositions for the manufacture of LWC and ULWC papers is kaolin obtained from kaolin clay. Large deposits of kaolin clay exist in Devon and Cornwall, England and in the States of Georgia and South Carolina, United States of America. Important deposits also occur in Brazil, Australia, and in several other countries. Kaolin clay consists predominantly of the mineral kaolinite, together with small proportions of various impurities. Kaolinite exists in the form of hydrous aluminosilicate crystals in the shape of thin hexagonal plates, but these plates tend to adhere together face-to-face to form stacks. The individual plates may have mean diameters of 1 μm or less, but kaolinite particles in the form of stacks of plates may have an equivalent spherical diameter of up to 10 μm or more. Generally speaking, kaolin clay particles which have an equivalent spherical diameter of 2 μm or more are in the form of stacks of kaolinite plates, rather than individual plates.

As long ago as 1939, Maloney disclosed in U.S. Pat. No. 2,158,987 that the finish, or gloss, of a clay coated paper is greatly improved if the clay, before incorporation in the coating composition, is treated so that a large percentage, for example 80% by weight or more, of the clay particles have a size in the range of 0.1 μm to 2 μm. In order to increase the proportion of fine particles in the raw kaolin, the raw kaolin may, according to the disclosure in U.S. Pat. No. 2,158,987, be subjected, before a centrifuging step, to a grinding operation in which a suspension containing from about 50% to about 75% by dry weight of kaolin and a dispersing agent is subjected to pebble milling. When the kaolin from the finer fraction is recovered, mixed with a suitable paper coating binder, and applied to the surface of a base paper, a coating of good gloss and colour is obtained.

Various pigment products which are made using the principles described by Maloney in U.S. Pat. No. 2,158,987 are commercially available and provide good gloss and smoothness in coated papers, especially for LWC and ULWC paper. For example, a pigment product available from the Applicants and recommended for gloss coatings of LWC consists of a refined English kaolin product having a particle size distribution, "psd", such that 89% by weight of the particles have an esd less than 2 μm, 74% by weight of the particles have an esd less than 1 μm and 25% by weight of the particles have an esd less than 0.25 μm.

Such commercially available pigment products are not ideal, however. For example, their performance with starch adhesives could be improved. Starches are naturally available from vegetable sources and are the cheapest adhesives for use in coating compositions. However, LWC, ULWC and like papers produced using a coating composition comprising commercially available pigment together with starch suffers from a reduction in gloss compared with similar paper coated with a composition incorporating more expensive synthetic adhesive.

It is an object of the present invention to provide a pigment product showing improved gloss, particularly but not exclusively when used in a paper coating composition incorporating starch as adhesive or binder ingredient to coat paper to produce LWC, ULWC and other gloss paper products.

According to the present invention in a first aspect there is provided a pigment product suitable for use in a coating composition to provide a gloss coating on paper, the pigment product comprising a processed particulate kaolin which has a particle size distribution (psd) such that at least 80% by weight of the particles have an equivalent spherical diameter (esd) less than 2 μm and not less than 8%, preferably not less than 12% by weight, of the particles have an equivalent spherical diameter (esd) less than 0.25 μm and whose particles have a shape factor of at least 45.

The pigment product according to the first aspect of the invention unexpectedly and beneficially provides improved gloss when incorporated in coating compositions, especially including starch, for gloss paper coating applications as demonstrated later in this specification.

The pigment product according to the first aspect of the invention has an unusual combination of properties which are not normally obtained by conventional processing of kaolin clays from known sources. The reasons for this are as follows.

A kaolin product of high shape factor is considered to be more "platey" than a kaolin product of low shape factor. "Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078 and using the equations derived in these patent specifications. "Mean particle diameter" is defined as the diameter of a circle which has the same area as the largest face of the particle. In the measurement method described in EP-A-0528078 the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material under test is determined.

The kaolin deposits in England differ from those in the United States of America in that the English deposits are of primary kaolin, whilst those in the USA are of the sedimentary or secondary type. Kaolin was formed in geological times by the hydrothermal decomposition of the feldspar component of granite, and primary kaolin is that which is obtained directly from the granite matrix in which it was originally formed. On the other hand, secondary or (tertiary) kaolin also known as sedimentary kaolin has been washed out of the original granite matrix in geological times and has been deposited in an area remote from the site in which it was originally formed. Secondary kaolin deposits tend to have a higher proportion of fine particles, ie those having an esd smaller than 2 $\mu$m, because the kaolin has undergone a certain amount of natural grinding during the course of its transport from its site of origin to its site of final deposition. Jepson (Jepson, W B, "Kaolins: their properties and uses", Phil Trans R Soc Lond, A311, 1984, pp 411–432) has shown that a sample of an English primary kaolin clay, which has been subjected to a particle size separation such that substantially all particles having an esd larger than 5 $\mu$m have been removed, will comprise particles in the form of roughly hexagonal plates having diameters in the range of from about 8 $\mu$m down to about 0.1 $\mu$m, with shape factors which will vary from the coarsest particles to the finest particles the shape factor being from about 20 to about 30. On the other hand, a sample of secondary kaolin clay from Georgia, USA, which has been subjected to a particle size separation such that substantially all particles having an esd larger than 5 $\mu$m have been removed, will typically comprise particles which more nearly conform to a regular hexagonal shape and which has diameters of 0.1 $\mu$m and above, but a generally finer distribution of diameters than is the case with the English kaolin. The shape factor of kaolins of Georgia, USA kaolin presently processed to provide commercial products will often lie within the range of from about 6 to about 10, but there will be little variation in the shape factor with particle diameter.

Thus, the pigment product according to the present invention is not readily derivable from either the kaolins available from England or from Georgia, USA which together are representative of the different kaolins of the world.

The pigment product according to the first aspect of the present invention may be produced by treating a raw particulate hydrous kaolin mineral of the sedimentary type, and especially a raw or partially processed kaolin clay of the type which occurs in Georgia, USA.

The pigment product according to the first aspect of the invention may have a particle size distribution "psd" such that at least 80%, preferably at least 84%, by weight of the particles have an esd smaller than 2 $\mu$m and not less than 12% by weight of the particles, preferably from 15% to 35%, especially 18% to 26%, have an esd smaller than 0.25 $\mu$m. Desirably, at least 60%, preferably at least 65% by weight have an esd less than 1 $\mu$m. The mean particle esd may be from 0.3 $\mu$m to 0.8 $\mu$m, especially from 0.5 $\mu$m to 0.7 $\mu$m.

As will be appreciated by those skilled in the art, the psd and mean esd of a particulate product such as the pigment product according to the present invention may be determined by measuring the speeds at which dispersed particles of the particulate product under test sediment through a standard dilute aqueous suspension using a SEDIGRAPH™ machine, eg SEDIGRAPH 5100, obtained from Micromeritics Corporation, USA. The size of a given particle is expressed in terms of the diameter of a sphere of equivalent diameter, which sediments through the suspension is expressed as the equivalent spherical diameter or esd, the parameter as referred to above. The SEDIGRAPH machine graphically records the percentage by weight of particles having esd less than a certain esd value versus esd.

Preferably, the percentage by weight of particles having an esd in the range 0.75 $\mu$m to 0.25 $\mu$m of the pigment product according to the first aspect of the invention is 40% or greater, eg from 40% to 50%. The shape factor of the pigment product is preferably at least 50, desirably at least 55, eg 55 to 65.

According to the present invention in a second aspect there is provided a method for producing a pigment product according to the first aspect, the method comprising the steps of:

(a) mixing a raw or partially processed kaolin clay with water to form an aqueous suspension;
(b) subjecting the suspension produced by step (a) to attrition grinding using a particulate grinding medium by a process in which the average shape factor of the kaolin clay is increased by at least 10, preferably at least 20;
(c) separating the suspension of ground kaolin clay from the particulate grinding medium; and
(d) dewatering the suspension of ground kaolin clay separated in step (c) to recover a kaolin pigment therefrom.

In step (a) of the method according to the second aspect of the present invention, the kaolin clay may form from 20% to 70%, usually from 20% to 45% of the treated suspension. The kaolin clay preferably comprises a sedimentary kaolin clay, most preferably a sedimentary kaolin clay from Georgia, USA. The raw kaolin clay may have a psd such that not more than about 40% by weight consists of particles having an esd larger than 10 $\mu$m and not more than 50% by weight, eg from about 20% to about 40% by weight, consists of particles having an esd smaller than 2 $\mu$m. The shape factor of the kaolin clay treated in step (a) may be less than 15, eg in the range of from about 5 to about 10. Thus, the shape factor may be increased by a differential of at least 30, in some cases at least 40, eg from a shape factor value of less than 15 to a shape factor value greater than 55.

When preparing an aqueous suspension of the kaolin clay to be treated in step (a) a dispersing agent for the kaolin clay may or may not be added to the kaolin clay.

The kaolin clay employed in step (a) of the method according to the second aspect may be a coarse component obtained from classifying, eg using a centrifuge, a standard blocky sedimentary kaolin clay, eg having a shape factor of from 5 to 10. The coarse component may have not more than 50% by weight of particles having an esd less than 2 $\mu$m and not more than 10% by weight having an esd less than 0.25 $\mu$m.

The psd of the kaolin clay may be adjusted so that it is in accordance with the first aspect of the invention by blending from 99 to 50 parts by weight of the kaolin clay with from 1 to 50 parts by weight, especially from 10 to 30 parts by weight, of a fine platey kaolin component, ie having a shape factor of at least 15, preferably from 15 to 40 and whose percentages by weight of particles smaller than 2 μm and 0.25 μm are respectively at least 85% by weight and at least 20% by weight. The fine platey kaolin component may be a kaolin derived from either a primary or a sedimentary deposit. The fine platey kaolin component may be added to the kaolin of or obtained from the coarse component prior to or after the grinding step (b). The addition may be carried out with the kaolins to be blended in either powdered dry form or in the form of an aqueous suspension.

We have found that by producing a kaolin product by blending in the manner described, the rheology and dewatering characteristics of an aqueous suspension of the kaolin processed in accordance with the method of the second aspect are improved giving better runnability and particle alignment when the kaolin is used in a coating composition as described later.

The kaolin clay treated in the method according to the second aspect of the invention may be subjected to one or more well known purification steps to remove undesirable impurities, eg between steps (a) and (b). For example, the aqueous suspension of kaolin clay may be subjected to a froth flotation treatment operation to remove titanium containing impurities in the froth. Alternatively, or in addition, the suspension may be passed through a high intensity magnetic separator to remove iron containing impurities.

Step (b) may comprise a process wherein the suspension of kaolin clay is treated by medium attrition grinding wherein an energy of from about 40 kWh to about 250 kWh per tonne of clay (on a dry weight basis) is dissipated in the suspension.

The process of step (b) may itself comprise a process comprising at least two stages, namely a first stage (b1) wherein delamination of the kaolin clay occurs and a second stage (b2) wherein comminution of the platelets of the kaolin clay occurs.

Thus, it has been found to be beneficial to subject the suspension of the kaolin clay to a relatively gentle comminution step (b1), eg grinding using a particulate grinding medium in order to break down composite particles which are present in the raw kaolin clay. Such composite particles generally comprise coherent stacks or blocks of individual hexagonal plate-like particles, especially where the kaolin clay is from a sedimentary deposit. When the kaolin clay is subjected to relatively gentle comminution, eg by grinding in step (b1), the composite particles are broken down to give the individual thin, substantially hexagonal plates. Such a process is generally well known in the art and is referred to as "delamination", and has the result of increasing the average shape factor of the kaolin clay. For example, this process may increase the shape factor of the kaolin clay from a starting shape factor of about 5 to 10 to an increased shape factor of at least about 50 to 55. By "relatively gentle grinding" we mean grinding in an attrition grinding mill with a particulate grinding medium, the contents of the attrition grinding mill being agitated by means of an impeller which rotates at a speed which is insufficient to set up a vortex in the suspension, ie at a peripheral speed below about 10 m.s$^{-1}$ and in which the amount of energy dissipated in the suspension during grinding is less than about 75 kWh, usually less than about 55 kWh per tonne of kaolin clay on a dry weight basis. The particulate grinding medium is preferably of relatively high specific gravity, for example 2 or more, and may for example comprise grains of silica sand, the grains generally having diameters not larger than about 2 mm and not smaller than about 0.25 mm.

In stage (b2) of the two stage form of step (b) in the method according to the second aspect, the grinding is preferably performed in an attrition grinding mill which is equipped with a stirrer which is capable of being rotated at a speed such that a vortex is formed in the suspension in the mill during grinding. Again, the particulate grinding medium preferably has a specific gravity of 2 or more, and advantageously comprises grains of silica sand the grains generally having diameters not larger than about 2 mm and not smaller than about 0.25 mm. If stage (b2) is preceded by a relatively gentle comminution in stage (b1), the amount of energy dissipated in the suspension of kaolin clay in stage (b2) is preferably in the range of from about 40 kWh to about 120 kWh per dry tonne of kaolin clay. However, if the relatively gentle comminution step (b1) is omitted, the amount of energy dissipated in the suspension of kaolin clay in step (b) is preferably in the range of from about 100 kwh to about 250 kWh per dry tonne of kaolin clay.

In step (c) of the method according to the second aspect of the invention, the suspension of ground kaolin clay is conveniently separated from the particulate grinding medium in a known manner, eg by passing the suspension through a sieve of appropriate aperture size, for example a sieve having nominal aperture sizes in the range of from about 0.1 mm to about 0.25 mm.

Following step (c) or step (d) the kaolin clay may be further treated to improve one or more of its properties. For example high energy liquid working, eg using a high speed mixer, may be applied to the product in slurry form, eg before step (d) or after step (d) and subsequent re-dispersion in an aqueous medium, eg during makedown of a coating composition.

In step (d) of the method according to the second aspect of the invention, the suspension of ground kaolin may be dewatered in one of the ways well known in the art, eg filtration, centrifugation, evaporation and the like. Dewatering using a filter press is preferred. For example, use of a filter press may be made to form a cake having a water content in the range of from about 15% to about 35% by weight. This cake may be mixed with a dispersing agent for the kaolin clay and thus converted into a fluid slurry which may be transported and sold in this form. Alternatively, the kaolin clay may be thermally dried, for example by introducing the fluid slurry of the kaolin clay into a spray drier and thereby transported in a substantially dry form.

A fine platey kaolin component may be blended with the product of step (d) in the manner described earlier if such a component has not already been added prior to step (d).

The pigment product according to the first aspect of the invention may have a specific surface area as measured by the BET, N$_2$ method of at least 12 m.g$^{-1}$, preferably from 15 m.g$^{-1}$ to 20 m.g$^{-1}$.

The pigment product according to the first aspect of the present invention may be used in paper coating as follows.

According to the present invention in a third aspect there is provided a coating composition for use in producing gloss coatings on paper and other substrates which composition comprises an aqueous suspension of a particulate pigment together with a hydrophilic adhesive or binder, wherein the particulate pigment comprises the pigment product according to the first aspect of the invention.

The solids content of the paper coating composition according to the third aspect of the invention may be greater than 60% by weight, preferably at least 70%, preferably as high as possible but still giving a suitably fluid composition which may be used in coating. The composition may include a dispersing agent, eg up to 2% by weight of a polyelectrolyte based on the dry weight of pigment present. For example, polyacrylates and copolymers containing polyacrylate units are well known as suitable polyelectrolytes. The pigment product according to the first aspect of the invention may be used as the sole pigment in the paper coating composition according to the third aspect, or it may be used in conjunction with one or more other known pigments, such as for example, (commercially available) kaolin, calcined kaolin, natural or precipitated calcium carbonate, titanium dioxide, calcium sulphate, satin white, talc and so called 'plastic pigment'. When a mixture of pigments is used the pigment product according to the first aspect of the invention is preferably present in the mixture in an amount of at least 80% of the total dry weight of the mixed pigments.

The binder of the composition according to the third aspect may conveniently comprise an adhesive derived from natural starch obtained from a known plant source, for example, wheat, maize, potato or tapioca although it is not essential to use starch as a binder ingredient. Other binders, which may be used with or without starch are mentioned later.

Where starch is employed as a binder ingredient, the starch may be unmodified or raw starch, or it may be modified by one or more chemical treatments known in the art. The starch may, for example, be oxidised to convert some of its —$CH_2OH$ groups to —COOH groups. In some cases the starch may have a small proportion of acetyl, —$COCH_3$, groups. Alternatively, the starch may be chemically treated to render it cationic or amphoteric, ie with both cationic and anionic charges. The starch may also be converted to a starch ether, or hydroxyalkylated starch by replacing some —OH groups with, for example, —$O.CH_2.CH_2OH$ groups, —$O.CH_2.CH_3$ groups or —$O.CH_2.CH_2.CH_2OH$ groups. A further class of chemically treated starches which may be used is that known as the starch phosphates. Alternatively, the raw starch may be hydrolysed by means of a dilute acid or an enzyme to produce a gum of the dextrin type. The amount of the starch binder used in the composition according to the third aspect is preferably from 4% to 25% by weight, based on the dry weight of pigment. The starch binder may be used in conjunction with one or more other binders, for example synthetic binders of the latex or polyvinyl acetate or polyvinyl alcohol type. When the starch binder is used in conjunction with another binder, eg a synthetic binder, the amount of the starch binder is preferably from 2% to 20% by weight, and the amount of the synthetic binder from 2% to 12% by weight, both based on the weight of dry pigment. Preferably, at least 50% by weight of the binder mixture comprises modified or unmodified starch.

According to the present invention in a fourth aspect there is provided a method of use of the coating composition according to the third aspect which comprises applying the composition to coat a sheet of paper and calendering the paper to form a gloss coating thereon. Preferably, the gloss coating is formed on both sides of the paper.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied. Five or more passes through the nips may be applied.

The paper after coating and calendering in the method according to the fourth aspect may have a total weight per unit area in the range 30 g.m$^{-2}$ to 70 g.m$^{-2}$, especially 49 g.m$^{-2}$ to 65 g.m$^{-2}$ or 35 g.m$^{-2}$ to 48 g.m$^{-2}$. The final coating preferably has a weight per unit area preferably from 3 g.m$^{-2}$ to 20 g.m$^{-2}$, especially from 5 g.m$^{-2}$, to 13 g.m$^{-2}$. Such a coating may be applied to both sides of the paper. Thus, the coated paper may be LWC or ULWC paper. The paper gloss may be greater than 45 TAPPI units and the Parker Print Surf value at a pressure of 1 MPa of each paper coating may be less than 1 $\mu$m.

The gloss of a coated paper surface may be measured by means of a test laid down in TAPPI Standard No 480 to 65. The intensity of light reflected at an angle from the surface of the paper is measured and compared with a standard of known gloss value. The beams of incident and reflected light are both at an angle of 75° to the normal to the paper surface. The results are expressed in TAPPI gloss units. The gloss of the pigment product according to the first aspect may be greater than 50, in some cases greater than 55, TAPPI units.

The Parker Print Surf test provides a measure of the smoothness of a paper surface, and comprises measuring the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean cube gap in $\mu$m between the paper surface and the reference material is calculated. A smaller value of this gap represents a higher degree of smoothness of the surface of the paper under test.

As noted above, an improvement is provided by the present invention where the binder present in the coating composition according to the third aspect comprises starch. However, an improvement is also obtained where other known starch free binders are employed (with or without starch present). In each case the adhesive or binder may form from 4% to 30%, eg 8% to 20%, especially 8% to 15% by weight of the solids content of the composition. The amount employed will depend upon the composition and the type of adhesive, which may itself incorporate one or more ingredients. For example, hydrophilic adhesives used in the art, eg incorporating one or more of the following adhesive or binder ingredients may be used in the following stated amounts:

(a) latex: levels range from 4% by weight to 20% by weight. The latex may comprise for example a styrene butadiene, acrylic latex, vinyl acetate latex, or styrene acrylic copolymers.

(b) other binders: levels again range from eg 4% by weight to 20% by weight. Examples of other binders include casein, polyvinyl alcohol and polyvinyl acetate.

Additives in various known classes may, depending upon the type of coating and material to be coated, be included in the coating composition according to the third aspect of the present invention. Examples of such classes of optional additive are as follows:

(a) cross linkers: eg in levels of up to 5% by weight; for example glyoxals, melamine formaldehyde resins, ammonium zirconium carbonates.

(b) water retention aids: eg in up to 2% by weight, for example sodium carboxymethyl cellulose, hydroxyethyl cellulose, PVA (polyvinyl acetate), starches, proteins, polyacrylates, gums, alginates, polyacrylamide bentonite and other commercially available products sold for such applications.

(c) viscosity modifiers or thickeners: eg in levels up to 2% by weight; for example polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.

(d) lubricity/calendering aids: eg in levels up to 2% by weight, for example calcium stearate, ammonium stearate, zinc stearate, wax emulsions, waxes, alkyl ketene dimer, glycols.

(e) dispersants: eg in levels up to 2 percent by weight, for example polyelectrolytes such as polyacrylates and copolymers containing polyacrylate species, especially polyacrylate salts (eg sodium and aluminium optionally with a group II metal salt), sodium hexametaphosphates, non-ionic polyol, polyphosphoric acid, condensed sodium phosphate, non-ionic surfactants, alkanolamine and other reagents commonly used for this function.

(f) antifoamers/defoamers: eg in levels up to 1% by weight, for example blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

(g) dry or wet pick improvement additives: eg in levels up to 2% by weight, for example melamine resin, polyethylene emulsions, urea formaldehyde, melamine formaldehyde, polyamide, calcium stearate, styrene maleic anhydride and others.

(h) dry or wet rub improvement and abrasion resistance additives: eg in levels up to 2% by weight, for example glyoxal based resins, oxidised polyethylenes, melamine resins, urea formaldehyde, melamine formaldehyde, polyethylene wax, calcium stearate and others.

(i) gloss-ink hold-out additives: eg in levels up to 2% by weight, for example oxidised polyethylenes, polyethylene emulsions, waxes, casein, guar gum, CMC, HMC, calcium stearate, ammonium stearate, sodium alginate and others.

(j) optical brightening agents (OBA) and fluorescent whitening agents (FWA): eg in levels up to 1% by weight, for example stilbene derivatives.

(k) dyes: eg in levels up to 0.5% by weight.

(l) biocides/spoilage control agents: eg in levels up to 1% by weight, for example metaborate, sodium dodecylbenene sulphonate, thiocyanate, organosulphur, sodium benzonate and other compounds sold commercially for this function eg the range of biocide polymers sold by Calgon Corporation.

(m) levelling and evening aids: eg in levels up to 2% by weight, for example non-ionic polyol, polyethylene emulsions, fatty acid, esters and alcohol derivatives, alcohol/ethylene oxide, sodium CMC, HEC, alginates, calcium stearate and other compounds sold commercially for this function.

(n) grease and oil resistance additives: eg in levels up to 2% by weight, eg oxidised polyethylenes, latex, SMA (styrene maleic anhydride), polyamide, waxes, alginate, protein, CMC, HMC.

(o) water resistance additives: eg in levels up to 2% by weight, eg oxidised polyethylenes, ketone resin, anionic latex, polyurethane, SMA, glyoxal, melamine resin, urea formaldehyde, melamine formaldehyde, polyamide, glyoxals, stearates and other materials commercially available for this function.

(p) insolubiliser: eg in levels up to 2% by weight.

For all of the above additives, the percentages by weight quoted are based on the dry weight of pigment (100%) present in the composition. Where the additive is present in a minimum amount the minimum amount may be 0.01% by weight based on the dry weight of pigment.

The method according to the fourth aspect of the present invention may be carried out in a known way which will depend upon the material to be coated, the coating composition to be applied and other factors as determined by the operator, eg speed and ease of runnability eg using a conventional coating machine.

Methods of coating paper and other sheet materials are widely published and well known. For example, there is a review of such methods published in Pulp and Paper International, May 1994, page 18 et seq. Sheets may be coated on the sheet forming machine, ie. "on-machine", or "off-machine" on a coater or coating machine. Use of high solids compositions is desirable in the coating method because it leaves less water to evaporate subsequently. However, as is well known in the art, the solids level should not be so high that high viscosity and levelling problems are introduced.

All known methods of coating for use in step (b) of the method according to the fourth aspect of the present invention require (i) a means of applying the coating composition to the material to be coated, viz an applicator; and (ii) a means for ensuring that a correct level of coating composition is applied, viz a metering device. When an excess of coating composition is applied to the applicator, the metering device is downstream of it. Alternatively, the correct amount of coating composition may be applied to the applicator by the metering device, eg as a film press. At the points of coating application and metering, the paper web support ranges from a backing roll, eg via one or two applicators, to nothing (ie: just tension). The time the coating is in contact with the paper before the excess is finally removed is the dwell time and this may be short, long or variable.

The coating is usually added by a coating head at a coating station. According to the quality desired, paper grades are uncoated, single coated, double coated and even triple coated. When providing more than one coat, the initial coat (precoat) may have a cheaper formulation and optionally less pigment in the coating composition. A coater that is applying a double coating, ie. a coating on each side of the paper, will have two or four coating heads, depending on the number of sides coated by each head. Most coating heads coat only one side at a time, but some roll coaters (eg film press, gate roll, size press) coat both sides in one pass.

Examples of known coaters which may be employed in step (b) include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters and extrusion coaters.

In all examples of coating compositions described in this specification, water is added to the solids to give a concentration of solids which when coated onto a sheet to a desired target coat weight has a rheology suitable for the composition to be coated with a pressure (eg a blade pressure) of between 1 and 1.5 bar. Generally, the solids content may be from 60% to 70% by weight.

Embodiments of the present invention will now be described by way of example with reference to the following illustrative Examples.

EXAMPLE 1

A raw kaolin clay from a sedimentary deposit in Georgia, USA was suspended in water and the resultant suspension was passed through a high intensity magnetic separator to remove iron-containing impurities therefrom. After the magnetic separation step the kaolin clay was found to have a psd such that 30% by weight consisted of particles having an esd smaller than 2 μm, and 7.0% by weight consisted of particles having an esd smaller than 0.25 μm. The shape factor of the kaolin clay as measured by the method described in GB-A-2240398 was found to be 6.8.

The suspension of kaolin clay was then subjected to relatively gentle attrition grinding in a grinding chamber provided with a submerged internal impeller, the speed of rotation of which was insufficient to form a vortex in the suspension contained in the grinding chamber. The grinding medium was a silica sand having grains in the size range from 0.6 mm to 0.85 mm. The grinding was continued for a time such that the amount of energy dissipated in the suspension was 50.7 kWh per tonne of kaolin clay (on a dry weight basis). At the completion of this grinding step, the kaolin clay was found to have a psd such that 71.2% by weight consisted of particles having an esd smaller than 2 μm and 5.0% by weight consisted of particles having an esd smaller than 0.25 μm. The mean particle shape factor as measured by the method described in GB-A-2240398 was found to be 52.

The suspension of ground kaolin clay was separated from the grinding medium by elutriation and was then subjected to a second stage of attrition grinding in a grinding chamber equipped with a high-speed impeller which was capable of generating a vortex in the suspension contained in the chamber. The grinding medium used was Ottawa sand, a relatively pure silica sand with rounded grains, having a distribution of grain sizes between 0.5 and 1.0 mm. The solids concentration of the suspension was 27% by weight based on the dry weight of the kaolin clay. The grinding chamber was operated continuously in closed cycle with a hydrocyclone which separated sufficiently ground particles as product and returned insufficiently ground particles to the grinding chamber. The suspension of ground kaolin clay was discharged continuously through apertures high in the side walls of the grinding chamber, these apertures being covered with sieves of nominal aperture 0.25 mm to hold back the grains of the grinding medium. The suspension of ground kaolin clay passing through the sieves was collected in a trough surrounding the grinding chamber, from whence it was pumped under pressure to the hydrocyclone.

Samples A, B and C of the suspension of the ground kaolin clay were withdrawn from the recirculating system after times sufficient to dissipate in the suspension, respectively, 40 kWh, 60 kWh and 80 kWh of energy per tonne of kaolin clay (on a dry weight basis). The percentages by weight of particles in the products having esds larger than 10 μm, smaller than 2 μm, smaller than 1 μm and smaller than 0.25 μm, respectively, and the mean particle shape factors of the products were measured. The results are set forth in Table 1 as follows.

TABLE 1

| Sample | Energy dissipated (kWh · tonne$^{-1}$) | Larger than 10 μm | % by weight of particles Smaller than 2 μm | Smaller than 1 μm | Smaller than 0.25 μm | Mean particle shape factor |
|---|---|---|---|---|---|---|
| A | 40 | 1.3 | 87.2 | 66.8 | 8.0 | 56.8 |
| B | 60 | 0.2 | 89.9 | 72.6 | 17.9 | 60.0 |
| C | 80 | 0.4 | 92.2 | 76.8 | 20.8 | 68.4 |

EXAMPLE 2

A further sample of the same raw kaolin from Georgia, USA as was used in Example 1 was suspended in water to form an aqueous suspension containing 23.5% by weight of kaolin clay on a dry weight basis. Without preliminary magnetic separation treatment, this suspension was introduced into a recirculating attrition grinding system of the same type as that described in connection with the second stage of grinding in Example 1 above. Grinding was continued, with recirculation of insufficiently ground material, for a time sufficient to dissipate in the suspension 210 kWh of energy per tonne of the kaolin clay on a dry weight basis. After this time the ground kaolin clay was recovered from the suspension by filtration and subsequent thermal drying and was found to have a psd such that 0.2% by weight consisted of particles having an esd larger than 10 μm, 89.9% by weight consisted of particles having an esd smaller than 2 μm, 72.6% by weight consisted of particles having an esd smaller than 1 μm and 17.9% by weight consisted of particles having an esd smaller than 0.25 μm. The shape factor of the product was 59.7.

EXAMPLE 3

Ground kaolin product Sample C produced in Example 1 above was used as a pigment in a coating composition used for preparing an ULWC for offset printing. The coating composition had the composition shown in Table 2 as follows.

TABLE 2

| Ingredient | Parts by weight |
|---|---|
| Pigment under test | 88 |
| Calcined kaolin | 10 |
| Titanium dioxide | 2 |
| Starch binder | 12 |
| Synthetic latex binder | 6 |

The calcined kaolin had a particle size distribution such that 90% by weight consisted of particles having an esd smaller than 2 μm.

The starch binder was a hydroxyethyl ether of corn starch which is marketed under the trade name "PENFORD GUM 290".

The synthetic latex binder was a styrene butadiene rubber binder of the type which has been found to be suitable for use in offset coating formulations The parts by weight shown are parts by weight of latex solids.

The ground kaolin product C in accordance with an embodiment of the invention was compared with two commercially available products, namely commercially available pigments 1 and 2, which were each separately made into the composition shown in Table 2 above.

Commercially available pigment 1 was a delaminated kaolin clay from Georgia, USA having a particle sizes distribution such that 81.5% by weight consisted of particles having an esd smaller than 2 μm, 62.5% by weight consisted of particles having an esd smaller than 1.0 m and 20% consisted of particles having an esd smaller than 0.25 μm. The shape factor of the product was 29.

Commercially available pigment 2 was a fine English kaolin clay having a psd such that 89% by weight consisted of particles having an esd smaller than 2 μm, 74% by weight consisted of particles having an esd smaller than 1 μm and 25% by weight consisted of particles having an esd smaller than 0.25 μm. The particle shape factor of the product was 31.

Each composition under test was coated onto base paper of substance weight 30 g.m$^{-2}$ by means of a coating machine of the type described in GB-A-1032536 fitted with a short dwell time head. The paper speed was 1100 m.min$^{-1}$. Samples of a coated paper were prepared at different coat weights in the range of from about 4 g.m$^{-2}$ to about 7 g.m$^{-2}$ The coated paper was dried and then subjected to calendering by passage ten times between the rolls of a supercalender at a temperature of 80° C. and a pressure of 7 MPa.

The samples of calendered coated paper prepared from each of the three coating compositions were then tested for gloss according to TAPPI Standard No 480 ts-65, brightness, or percentage reflectance to light of a 457 nm wavelength, and Parker Print Surf using the soft backing material and a pressure of 1000 kPa. In each case the measured values were plotted graphically against coat weight, and the value which corresponded to a coat weight of 6 g.m$^{-2}$ was found by interpolation.

The results are set forth in Table 3 as follows.

TABLE 3

| Pigment | Gloss (TAPPI units) | % reflectance to light of 457 nm wavelength | Parker Print Surf 1000 kPa |
| --- | --- | --- | --- |
| Pigment in accordance with an embodiment of the invention | 47 | 69.8 | 0.83 |
| Commercially available pigment 1 | 38 | 67.9 | 0.98 |
| Commercially available pigment 2 | 40 | 68.6 | 1.13 |

It can be seen from Table 3 that the pigment in accordance with an embodiment of the invention provides an ULWC paper, suitable for use in offset printing, which paper has considerably improved gloss, brightness and smoothness as compared with coated papers which have been prepared using commercially available pigments which are generally recommended for preparing coated papers of this type. It will be noted, in particular, that commercially available pigment 2 has a particle size distribution which closely resembles that of the pigment in accordance with the invention, and it would generally be expected that this pigment would have approximately equal performance to that of the pigment in accordance with the invention when used as a pigment in a paper coating composition. However, the pigment in accordance with an embodiment of the invention is seen to be superior even to this fine commercially available pigment.

EXAMPLE 4

A raw kaolin from a sedimentary deposit in Georgia, US was suspended in water and the resultant suspension was degritted, treated with a dispersing agent, and classified in a decanter centrifuge under conditions such that the overflow product produced by the centrifuge had a psd such that about 90% by weight of the particles had an esd smaller than 2 μm. The underflow product of the centrifuge was passed through a high intensity magnetic separator to remove iron-containing impurities and the magnetically purified product suspension was then subjected to attrition grinding using silica sand as a grinding medium. The suspension of ground kaolin particles was then subjected to a second stage of classification in a decanter centrifuge. The overflow product from this centrifuge had a particle size distribution such that 84% by weight of the particles had an esd smaller than 2 μm, and the underflow product was used as the feed for the next stage in the process.

This second underflow product was found to have a psd such that 9% by weight consisted of particles having an esd larger than 10 μm, 28% by weight consisted of particles having an esd smaller than 2 μm and 4% by weight consisted of particles having an esd smaller than 0.25 μm. The shape factor of this underflow product as measured by the method described in GB-A-2240398 was found to be 28.

The suspension of kaolin clay was then subjected to relatively gentle attrition grinding in a grinding chamber provided with a submerged internal impeller, the speed of rotation of which was insufficient to form a vortex in the suspension contained in the grinding chamber. The grinding medium was a silica sand having grains in the size range from 0.6 mm to 0.85 mm. The grinding was continued for a time such that the amount of energy dissipated in the suspension was 30.9 kwh per tonne of dry kaolin clay. At the completion of this grinding step, the kaolin clay was found to have a psd such that 3% by weight consisted of particles having an esd larger than 10 μm, 47% by weight consisted of particles having an esd smaller than 2 μm and 5% by weight consisted of particles having an esd smaller than 0.25 μm. The shape factor of the kaolin clay after grinding as measured by the method described in GB-A-2240398, was found to be 65.9.

The suspension of ground kaolin clay was separated from the grinding medium by elutriation and was then classified in a decanter centrifuge under conditions such that the overflow product produced by the centrifuge had a psd such that 90% by weight of the particles had an esd smaller than 2 μm. The overflow product from the centrifuge was then acidified with sulphuric acid, bleached with 3 kg of sodium dithionite bleaching reagent per dry tonne of kaolin, dewatered in a filterpress, and the cake thus formed was redispersed with the aid of 0.25% by weight, based on the dry weight of kaolin, of a sodium polyacrylate dispersing agent. The dispersed suspension was then spray dried to form a dry powder.

The final kaolin clay product had a psd such that 89% by weight consisted of particles having an esd smaller than 2 μm, 69% by weight consisted of particles having an esd smaller than 1 μm and 18% by weight consisted of particles having an esd smaller than 0.25 μm. The shape factor as measured by the method described in GB-A-2240398 was found to be 65.

This product was identified as ground kaolin product D.

EXAMPLE 5

A raw kaolin from a sedimentary deposit in Georgia, US was suspended in water and the resultant suspension was degritted, treated with a dispersing agent, and classified in a decanter centrifuge under conditions such that the overflow product produced by the centrifuge had a psd such that 90% by weight of the particles had an esd smaller than 2 μm. The underflow product of the centrifuge was passed through a high intensity magnetic separator to remove iron-containing impurities and the magnetically purified product suspension was then subjected to attrition grinding using silica sand as a grinding medium. The suspension of ground kaolin particles was then subjected to a second stage of classification in a decanter centrifuge. The overflow product from this centrifuge had a psd such that 84% by weight of the particles had an esd smaller than 2 μm, and the underflow product was used as the feed for the next stage in the process.

This second underflow product was found to have a psd such that 8% by weight consisted of particles having an esd larger than 10 μm, 30% by weight consisted of particles having an esd smaller than 2 μm and 4% by weight consisted of particles having an equivalent spherical diameter smaller than 0.25 μm. The shape factor of this underflow product as measured by the method described in GB-A-2240398 was found to be 36.

The suspension of kaolin clay was then subjected to relatively gentle attrition grinding in a grinding chamber provided with a submerged internal impeller, the speed of rotation of which was insufficient to form a vortex in the suspension contained in the grinding chamber. The grinding medium was a silica sand having grains in the size range from 0.6 mm to 0.85 mm. The grinding was continued for a time such that the amount of energy dissipated in the suspension was 17.2 kWh per tonne of dry kaolin clay. At the completion of this grinding step, the kaolin clay was found to have a psd such that 5% by weight consisted of particles having an esd larger than 10 μm, 41% by weight consisted of particles having an esd smaller than 2 μm and 5% by weight consisted of particles having an esd smaller than 0.25 μm. The particle shape factor after grinding, as measured by the method described in GB-A-2240398, was found to be 48.5.

The suspension of ground kaolin clay was separated from the grinding medium by elutriation and was then classified in a decanter centrifuge under conditions such that the overflow product produced by the centrifuge had a psd such that 90% by weight of the particles had an esd smaller than 2 μm. The overflow product from the centrifuge was then acidified with sulphuric acid, bleached with 3 kg of sodium dithionite bleaching reagent per tonne of dry kaolin, dewatered in a filterpress, and the cake thus formed was redispersed with the aid of 0.25% by weight, based on the weight of dry kaolin, of a sodium polyacrylate dispersing agent. The dispersed suspension was then spray dried to form a dry powder.

The final kaolin clay product had a psd such that 90% by weight consisted of particles having an esd smaller than 2 μm, 72% by weight consisted of particles having an esd smaller than 1 μm and 21% by weight consisted of particles having an esd smaller than 0.25 μm. The shape factor of the product as measured by the method described in GB-A-2240398 was found to be 54.

This product was identified as ground kaolin product E.

EXAMPLE 6

A typical paper coating composition of the type used for preparing a coated paper for rotogravure printing had the composition as shown in Table 4 as follows:

TABLE 4

| Ingredient | Parts by weight |
| --- | --- |
| Pigment under test | 90 |
| Calcined kaolin | 10 |
| Synthetic latex binder | 6 |
| Synthetic acrylic thickener | 0.2 |
| Sodium hydroxide to pH 8 | |

The calcined kaolin was the same as that used in Example 3.

The synthetic latex binder was a styrene butadiene rubber binder of the type which has been found to be suitable for use in rotogravure coating formulations. The parts by weight shown are parts by weight of latex solids.

Paper coating compositions were prepared according to the formulation specified in Table 4 containing as the pigment under test, respectively:

Composition 1

(i) 75 parts by weight of ground kaolin product D prepared as described in Example 4; and (ii) 15 parts by weight of a commercially available, high quality paper coating-grade English kaolin having a psd such that 89% by weight consisted of particles having an esd smaller than 2 μm, 75% by weight consisted of particles having an esd smaller than 1 μm and 25% by weight consisted of particles having an esd smaller than 0.25 μm, and a mean particle shape factor of 35.

Composition 2

(i) 75 parts by weight of ground kaolin product D prepared as described in Example 4; and (ii) 15 parts by weight of a high quality commercially available paper coating-grade kaolin from Georgia, US having a psd such that 95% by weight consisted of particles having an esd smaller than 2 μm, 91% by weight consisted of particles having an esd smaller than 1 μm and 52% by weight consisted of particles having an esd smaller than 0.25 μm, and a shape factor of 17.

Each composition was coated onto a web of base paper of substance weight 31 g.m$^{-2}$ by means of a pilot paper coating machine fitted with a short dwell time head. The paper speed was 1100 m.min$^{-1}$ and the blade angle was 45°. The solids concentration of the coating composition was adjusted so that the pressure of the hydraulic fluid supplied to a pressurisable tube used for biasing the blade against the web of paper was in the range of from 1.0 to 1.5 bar in order to provide the desired coat weight. The dry weight of the coating applied to the web of paper was in each case 6 g.m$^{-2}$. The coated paper was dried and then subjected to calendering by passage ten times between the rolls of a pilot-scale supercalender at a temperature of 80° C. and a linear pressure of 230 kN.m$^{-1}$.

The samples of calendered coated paper were then tested for gloss, brightness and Parker Print Surf by the methods which were described in Example 3.

Samples of paper coated with the different coating compositions were also tested for gravure print quality by methods described in the article "Realistic paper tests for various printing processes" by A Swan, published in "Printing Technology", Vol 13, No 1, April 1969, pages 9–22. A gravure printing cylinder was used with an area of deeply etched cells to give a solid black area, and an area of less deeply etched cells to give a half-tone area. The half-tone area was used to estimate the percentage of gravure dots which were missing from the test print. This percentage was expressed as "% missing dots". The solid black area was used to measure the gravure print density using a Macbeth density meter.

The results obtained are set forth in Table 5 as follows.

TABLE 5

| Pigment | Gloss (TAPPI units) | % reflectance to light of 457 nm wavelength | Parker Print Surf 1000 kPa | % missing dots |
| --- | --- | --- | --- | --- |
| Composition 1 | 56 | 70.5 | 0.97 | 7.5 |
| Composition 2 | 53 | 69.6 | 0.98 | 9 |

The results in Table 5 show that when 75 parts by weight of a de-fined, high shape factor kaolin produced by method embodying the second aspect of the invention were blended with 15 parts by weight of a fine kaolin clay having a relatively high shape factor of 35 (Composition 1), the coated paper showed a higher gloss and brightness, and a better gravure print quality.

Paper which had been coated with a composition containing 75 parts by weight of the same de-fined, high shape factor kaolin employed in Composition 1 and 5 parts by weight of a kaolin clay having a relatively low shape factor of 17 (Composition 2) also showed acceptable properties. The smoothness of the coated paper was substantially the same in the two cases.

EXAMPLE 7

Further paper coating compositions were prepared according to the formulations given in Example 6 earlier.

In these compositions, the pigments under test were, respectively:

Composition 3

(i) 55 parts by weight of ground kaolin product D, prepared as described in Example 4; 20 parts by weight of ground kaolin product E, prepared as described in Example 5, and (ii) 15 parts by weight of the same English, high quality paper coating-grade kaolin as was used in Example 6.

Composition 4

(i) 55 parts by weight of ground kaolin product D, prepared as described in Example 4; (ii) 20 parts by weight of ground kaolin product E, prepared as described in Example 5, and (iii) 15 parts by weight of a high quality paper coating-grade kaolin from Georgia, US having a psd such that 97% by weight consisted of particles having an esd smaller than 2 μm, 91% by weight consisted of particles having an esd smaller than 1 μm and 44% by weight consisted of particles having an esd smaller than 0.25 μm, and a shape factor of 30.

Composition 5

(i) 55 parts by weight of ground kaolin product D, prepared as described in Example 4; (ii) 20 parts by weight of ground kaolin product E, prepared as described in Example 5, and (iii) 15 parts by weight of a No 2 paper coating-grade kaolin from Georgia, US having a psd such that 84% by weight consisted of particles having an esd smaller than 2 μm, 70$ by weight consisted of particles having an esd smaller than 1 μm and 25% by weight consisted of particles having an esd smaller than 0.25 μm, and a shape factor of 12.

Each composition was coated onto a web of base paper of substance weight 31 g.m$^{-2}$ by means of a pilot paper coating machine fitted with a short dwell time head. The paper speed was 1100 m.min$^{-1}$ and the blade angle was 44°. The solids concentration of each coating composition was adjusted so that the pressure of the hydraulic fluid supplied to a pressurisable tube used for biasing the blade against the web of paper was in the range of from 1.0 to 1.5 bar in order to provide the desired coat weight. The dry weight of the coating applied to the web of paper was in each case 6 g.m$^{-2}$. The coated paper was dried and then subjected to calendering by passage ten times between the rolls of a pilot-scale supercalender at a temperature of 80° C. and a linear pressure of 230 kN.m$^{-1}$.

The samples of calendered coated paper were then tested for gloss, brightness and Parker Print Surf by the methods which were described in Example 3. Samples were also tested for "% missing dots", or gravure print quality, by the method described in Example 6 earlier.

The results obtained are set forth in Table 6 as follows.

TABLE 6

| Pigment | Gloss (TAPPI units) | % reflectance to light of 457 nm wavelength | Parker Print Surf 1000 kPa | % missing dots |
| --- | --- | --- | --- | --- |
| Composition 3 | 63 | 68.9 | 0.85 | 2.7 |
| Composition 4 | 66 | 69.2 | 0.82 | 2.8 |
| Composition 5 | 59 | 68.6 | 0.87 | 2.3 |

These results show that paper coated with Compositions 3, 4 and 5 show good gloss and print properties.

What is claimed is:

1. A kaolin product comprising at least one particulate kaolin clay having a particle size distribution such that at least 80% by weight of the particles have an equivalent spherical diameter less than 2 μm and a shape factor of at least 45.

2. The kaolin product according to claim 1, wherein the product is a pigment product.

3. The kaolin product according to claim 1, wherein at least 8% by weight of the particles of the product have an equivalent spherical diameter less than 0.25 μm.

4. The kaolin product according to claim 1, wherein at least 12% by weight of the particles of the product have an equivalent spherical diameter less than 0.25 μm.

5. The kaolin product according to claim 1, wherein at least 84% by weight of the particles have an equivalent spherical diameter less than 2 μm, and at least 60% by weight of the particles have an equivalent spherical diameter less than 1 μm.

6. The kaolin product according to claim 1, wherein from 15% to 35% by weight of the particles have an equivalent spherical diameter less than 0.25 μm.

7. The kaolin product according to claim 1, wherein at least 50% by weight of the particles have an equivalent spherical diameter ranging from 0.75 μm to 0.25 μm.

8. The kaolin product according to claim 1, wherein the mean equivalent spherical diameter of the particles of the product ranges from 0.3 μm to 0.8 μm.

9. The kaolin product according to claim 1, wherein the shape factor of the particles of the product is at least 50.

10. The kaolin product according to claim 9, wherein the shape factor ranges from 55 to 65.

11. The kaolin product according to claim 1, wherein the particles have a BET surface area of at least 12 m$^2$/g.

12. The kaolin product according to claim 11, wherein the BET surface area ranges from 15 m$^2$/g to 20 m$^2$/g.

13. A kaolin product comprising at least one particulate kaolin having a particle size distribution such that at 80% by weight of the particles have an equivalent spherical diameter less than 2 µm and not less than 8% by weight of the particles have an equivalent spherical diameter less than 0.25 µm and a shape factor of at least 45.

14. The kaolin product according to claim 13, wherein the product is a pigment product.

15. The kaolin product according to claim 12, wherein at least 12% by weight of the particles of the product have an equivalent spherical diameter less than 0.25 µm.

16. The kaolin product according to claim 12, wherein at least 84% by weight of the particles have an equivalent spherical diameter less than 2 µm, and at least 60% by weight of the particles have an equivalent spherical diameter less than 1 µm.

17. The kaolin product according to claim 13, wherein from 15% to 35% by weight of the particles have an equivalent spherical diameter less than 0.25 µm.

18. The kaolin product according to claim 13, wherein at least 50% by weight of the particles have an equivalent spherical diameter ranging from 0.25 µm to 0.75 µm.

19. The kaolin product according to claim 13, wherein the mean equivalent spherical diameter of the particles of the product ranges from 0.3 µm to 0.8 µm.

20. The kaolin product according to claim 13, wherein the shape factor of the particles of the product is at least 50.

21. The kaolin product according to claim 20, wherein the shape factor ranges from 55 to 65.

22. The kaolin product according to claim 12, wherein the particles have a BET surface area of at least 12 $m^2/g$.

23. The kaolin product according to claim 22, wherein the BET surface area ranges from 15 $m^2/g$ to 20 $m^2/g$.

24. A coating composition comprising at least one aqueous suspension of a particulate pigment comprising at least one particulate kaolin having a particle size distribution such that at least 80% by weight of the particles have an equivalent spherical diameter less than 2 µm and a shape factor of at least 45, and a binder.

25. The coating composition according to claim 24, wherein the binder is hydrophilic.

26. The composition according to claim 24, wherein the binder forms from 4% to 30% of the solid content of the composition on a dry weight basis.

27. The composition according to claim 24, wherein the solid content of the composition ranges from 60% to 90% by weight of the composition.

28. The composition according to claim 24, wherein at least 80% by weight of the coating composition comprises the pigment.

29. The composition according to claim 24, the binder comprises a modified or unmodified starch.

30. The composition according to claim 24, wherein the binder comprises a starch-free binder.

31. A method of using the coating composition according to claim 24 comprising applying the composition to coat a sheet of paper and calendering the paper to form a gloss coating thereon.

32. A method of producing a kaolin product which comprises:
(a) subjecting a particulate kaolin clay suspension to attrition grinding using a particulate grinding medium by a process in which the average shape factor of the kaolin clay is increased by at least 10;
(b) separating the suspension from the particulate grinding medium; and
(c) dewatering the suspension to recover the kaolin product therefrom.

33. The method according to claim 32, wherein the kaolin product is a pigment product.

34. The method according to claim 32, further comprising, mixing a raw or partially processed kaolin clay with water to form an aqueous suspension prior to (a).

35. The method according to claim 32, wherein the kaolin clay suspension comprises a particulate sedimentary kaolin clay.

36. The method according to claim 35, wherein the kaolin clay comprises particles having an equivalent spherical diameter such that not more than 40% by weight have an equivalent spherical diameter larger than 10 µm, and not more than 50% by weight have an equivalent spherical diameter less than 2 µm.

37. The method according to claim 35, wherein the particles of the kaolin clay have a shape factor of not greater than 15.

38. The method according to claim 35, further comprising purifying the kaolin clay before subjecting the particulate kaolin clay to attrition grinding.

39. The method according to claim 38, wherein the purifying comprises froth floating or magnetic separation or both.

40. The method according to claim 35, further comprising treating the kaolin clay with liquid working following (b) or (c).

41. The method according to claim 35, further comprising comminuting the kaolin clay to provide delamination prior to grinding.

42. The method according to claim 41, wherein the comminuting comprises wet grinding in a suspension containing not more than 40% by weight solid, wherein the wet grinding is carried out using a particulate grinding medium under conditions in which no substantial vortex is set up in the suspension.

43. The method according to claim 41, wherein the comminuting results in an energy dissipation of less than 75 kWh per ton of kaolin present on a dry weight basis.

44. The method according to claim 41, wherein the comminuting is carried out under conditions wherein a vortex is formed in the suspension.

45. The method according to claim 44, wherein the comminuting results in an energy dissipation ranging from 40 kWh to 120 kWh per ton of kaolin clay present in a dry weight basis.

46. The method according to claim 34, further comprising addition of from 99 to 50 parts by weight of the kaolin clay with from 1 to 50 parts by weight of a further particulate kaolin clay having a shape factor of at least 15 and having at least 85% by weight of particles smaller than 2 µm and at least 20% by weight of particles smaller than 0.25 µm.

47. The method according to claim 46, wherein the additional kaolin clay is added prior to (a).

48. The method according to claim 46, wherein the additional kaolin clay is added following (b) or (c).

* * * * *